(12) United States Patent
Apdalhaliem et al.

(10) Patent No.: US 12,703,486 B2
(45) Date of Patent: Aug. 11, 2026

(54) VENTING SYSTEMS AND METHODS FOR AN INTERNAL CABIN OF AN AIRCRAFT

(71) Applicant: THE BOEING COMPANY, Arlington, VA (US)

(72) Inventors: Sahrudine Apdalhaliem, Seattle, WA (US); Claver Nitereka, Snohomish, WA (US); Waeil M. Ashmawi, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 135 days.

(21) Appl. No.: 18/614,803

(22) Filed: Mar. 25, 2024

(65) Prior Publication Data

US 2025/0002149 A1 Jan. 2, 2025

Related U.S. Application Data

(60) Provisional application No. 63/510,655, filed on Jun. 28, 2023.

(51) Int. Cl.
*B64D 11/00* (2006.01)
*B64D 45/00* (2006.01)

(52) U.S. Cl.
CPC .............. *B64D 11/00* (2013.01); *B64D 45/00* (2013.01)

(58) Field of Classification Search
CPC ................................ B64D 11/00; B64D 45/00
See application file for complete search history.

(56) References Cited

U.S. PATENT DOCUMENTS

| | | | | |
|---|---|---|---|---|
| 4,026,082 | A * | 5/1977 | Crofoot | F24F 7/00 52/656.2 |
| 6,129,312 | A * | 10/2000 | Weber | B64C 1/18 244/129.4 |
| 6,264,141 | B1 * | 7/2001 | Shim | B64C 1/18 244/118.5 |
| 9,114,869 | B1 * | 8/2015 | Barrett | B64C 1/1469 |
| 2019/0152609 | A1 * | 5/2019 | Kirkbride | B64C 1/1469 |

* cited by examiner

*Primary Examiner* — Valentina Xavier
(74) *Attorney, Agent, or Firm* — Joseph M. Butscher; Carroll, Hoette & Butscher, LLC

(57) ABSTRACT

A venting system is configured to be within an internal cabin of an aircraft. The venting system includes a door configured to be disposed within a frame of a wall of an enclosed area of the internal cabin. The door is configured to move between a closed position and an open position. A latch is configured to retain the door in the closed position. A sensor is operatively coupled to the latch. In response to detecting a predetermined pressure, the sensor is configured to trigger the latch to disengage the door from one or both of the frame or the wall to allow the door to move from the closed position to the open position.

20 Claims, 6 Drawing Sheets

VENTING SYSTEMS AND METHODS FOR AN INTERNAL CABIN OF AN AIRCRAFT

CROSS-REFERENCE TO RELATED APPLICATIONS

This application is a non-provisional conversion of, and claims priority to, U.S. Provisional Patent Application No. 63/510,655, filed Jun. 28, 2023, which is incorporated by reference in its entirety.

FIELD OF THE DISCLOSURE

Examples of the present disclosure generally relate to venting systems and methods for an internal cabin of an aircraft.

BACKGROUND OF THE DISCLOSURE

Commercial aircraft are used to transport passengers and/or cargo between various destinations. A typical commercial aircraft includes an internal cabin, including passenger seating areas. Certain aircraft include enclosed suites or other such private areas.

During flight, a projectile can impact a fuselage and form a punctured blow-out area. For example, the blow-out area can be proximate to a high wall first class suite, and can result in rapid decompression inside the suite. A sudden increase of pressure differential could potentially lead to damage to the floor of the suite, and/or other risks.

A known solution to such decompression includes passive louver venting to provide airflow into the suite. However, while louvers operate well in slow airflow scenarios, they may not operate fast enough when there is rapid airflow. Further, a louver may not be large enough in rapid decompression scenarios. Thus, in order to provide rapid airflow into the suite, active venting is also used.

Typically, active venting relies on a partition or panel that is activated to open via structural failure when subjected to high delta pressure. However, design and assembly variability may reduce an ability of the partition or panel to open fast enough to quickly neutralize the delta pressure below an acceptable design threshold. Further, known solutions that provide a decompression venting area are cumbersome, inconsistent, and may not provide reliable performance.

SUMMARY OF THE DISCLOSURE

Certain examples of the present disclosure provide a venting system configured to be within an internal cabin of an aircraft. The venting system includes a door (such as a moveable panel) configured to be disposed within a frame of a wall of an enclosed area of the internal cabin. The door is configured to move between a closed position and an open position. A latch is configured to retain the door in the closed position. A sensor is operatively coupled to the latch. In response to detecting a predetermined pressure, the sensor is configured to trigger the latch to disengage the door from one or both of the frame or the wall to allow the door to move from the closed position to the open position.

In at least one example, one or more preloaded coil hinges are coupled to the door. The preloaded coil hinges are configured to bias the door toward and into the open position.

In at least one example, the enclosed area is a high wall first class suite.

In at least one example, the wall is next to an aisle within the internal cabin.

The door in the open position provides a vent opening in the wall. The frame surrounds the vent opening. The vent opening is configured to allow air from a general cabin area outside of the enclosed area to flow into the enclosed area.

The frame can include stiffeners.

The door can include pins configured to fit within reciprocal slots of the frame.

The sensor can be configured to be mounted on or within the wall.

Certain examples of the present disclosure provide an aircraft including an internal cabin. An enclosed area is within the internal cabin. The enclosed area includes a wall having a frame. The aircraft also includes a venting system, as described herein.

Certain examples of the present disclosure provide a method for a venting system within an internal cabin of an aircraft, the venting system including a door disposed within a frame of a wall of an enclosed area of the internal cabin, wherein the door is configured to move between a closed position and an open position; a latch configured to retain the door in the closed position; and a sensor operatively coupled to the latch, wherein the method includes detecting, by the sensor, a predetermined pressure; in response to said detecting, triggering, by the sensor, the latch to disengage the door from one or both of the frame or the wall to allow the door to move from the closed position to the open position, wherein the door in the open position provides a vent opening in the wall, wherein the frame surrounds the vent opening; and allowing air from a general cabin area outside of the enclosed area to flow into the enclosed area through the vent opening.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word “a” or “an” should be understood as not necessarily excluding the plural of the elements or steps. Further, references to “one embodiment” are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Figure 1:
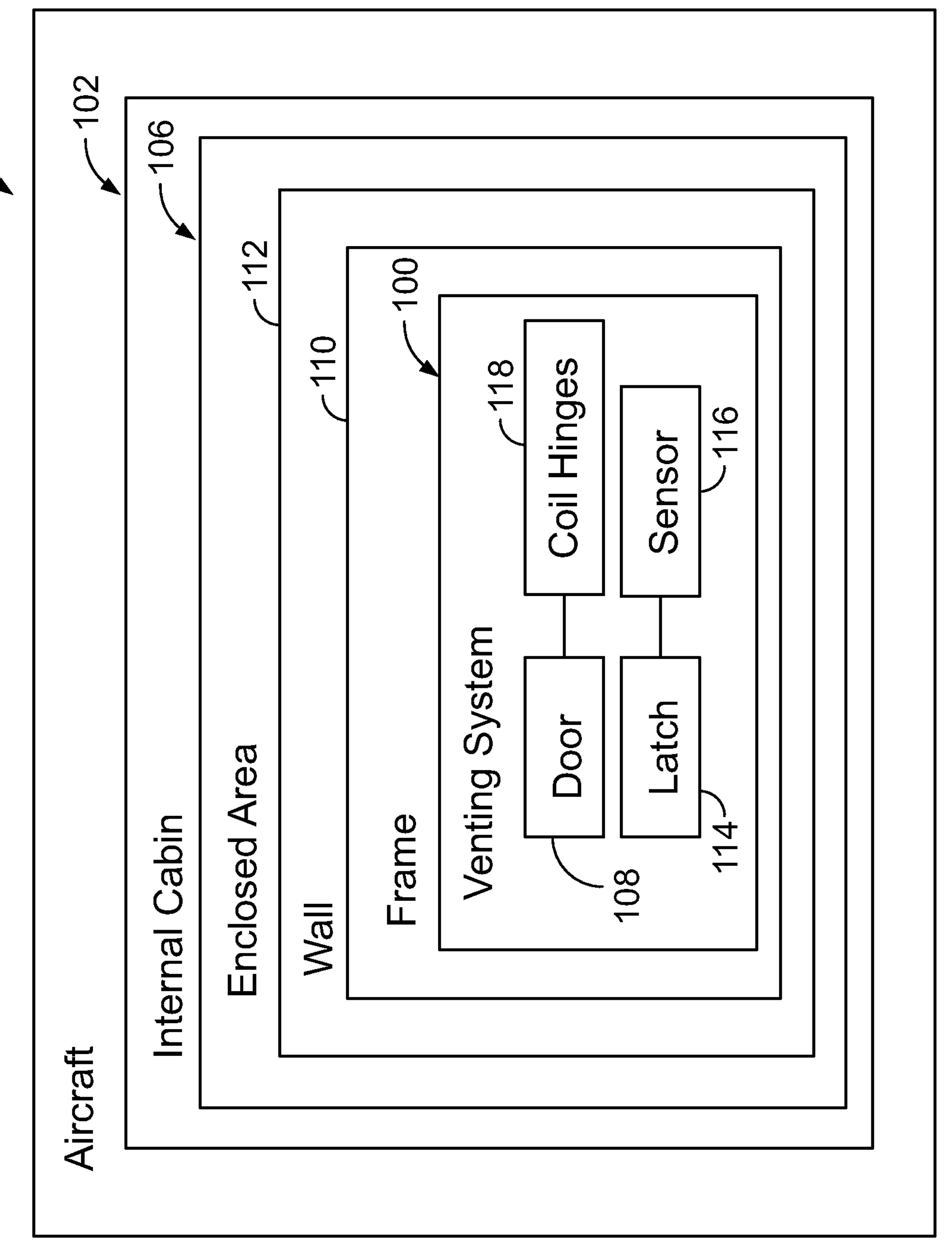
FIG. 1 illustrates a block diagram of a venting system within an internal cabin of an aircraft, according to an example of the present disclosure.

FIG. 1 illustrates a block diagram of a venting system 100 within an internal cabin 102 of an aircraft 104, according to an example of the present disclosure. The aircraft 104 includes the internal cabin 102, which has an enclosed area 106. The venting system 100 is configured to operate in response to a rapid decompression event within the internal cabin 102.

The venting system 100 includes a door 108, such as within a frame 110 of a wall 112 of the enclosed area 106. The door 108 is configured to move between a closed position and an open position. Optionally, the door 108 can be disposed within a recess of the wall 112, instead of a frame. As another example, the door 108 can be within a different part of the enclosed area 106, such as a ceiling or floor.

The venting system 100 also includes a latch 114 configured to retain the door 108 in the closed position. The venting system 100 also includes a sensor 116 operatively coupled to the latch 114. For example, the sensor 116 can be connected to the latch 114 through a mechanical link, such as one or more arms, wires, fuses, and/or the like. As another example, the sensor 116 can be electrically connected to the latch 114, such as through one or more wired or wireless connections configured to carry electrical signals. The sensor 116 is configured to detect a predetermined pressure and trigger the latch 114 to allow the door 108 to move into the open position. For example, in response to the sensor 116 detecting the predetermined pressure, the latch 114 is triggered and disengages the door 108 from the frame 110 and/or the wall 112, thereby allowing the door 108 to move into the open position.

In at least one example, the venting system 100 also includes one or more preloaded coil hinges 118 coupled to the door 108 and/or the wall 112. The coil hinges 118 are configured to bias the door 108 toward and into the open position. For example, when the latch 114 is triggered by the sensor 116, the coil hinges 118 automatically bias the door 108 into the open position. When the latch 114 fully couples the door 108 to the frame 110 and/or the wall 112, the latch 114 overcomes the push force or detect force of the coil hinges 118 to retain the door 108 in the closed position.

In at least one example, the enclosed area 106 includes a high wall first class suite. The first class suite is high wall in that it provides an enclosed area defined by walls that extend from and between a floor and a ceiling within the internal cabin 102. As another example, the enclosed area 106 can be a flight deck or cockpit. As another example, the enclosed area 106 can be a lavatory. As another example, the enclosed area 106 can be a galley. As another example, the enclosed area 106 can be a cargo hold. As another example, the enclosed area 106 can be a crew rest area.

As described herein, the venting system 100 is configured to be within the internal cabin 102 of the aircraft 104. The venting system 100 includes the door 108, which is configured to be disposed within the frame 110 of the wall 112 of the enclosed area 106 of the internal cabin 102. The door 108 is configured to move between a closed position and an open position. The latch 114 configured to retain the door in the closed position, such as by coupling the door 108 to a portion of one or both of the frame 110 or the wall 112. The sensor 116 is operatively coupled to the latch 114. In response to detecting a predetermined pressure, the sensor 116 is configured to trigger the latch 114 to disengage the door 108 from the frame 110 and/or the wall 112 to allow the door 108 to move from the closed position to the open position.

Figure 2:
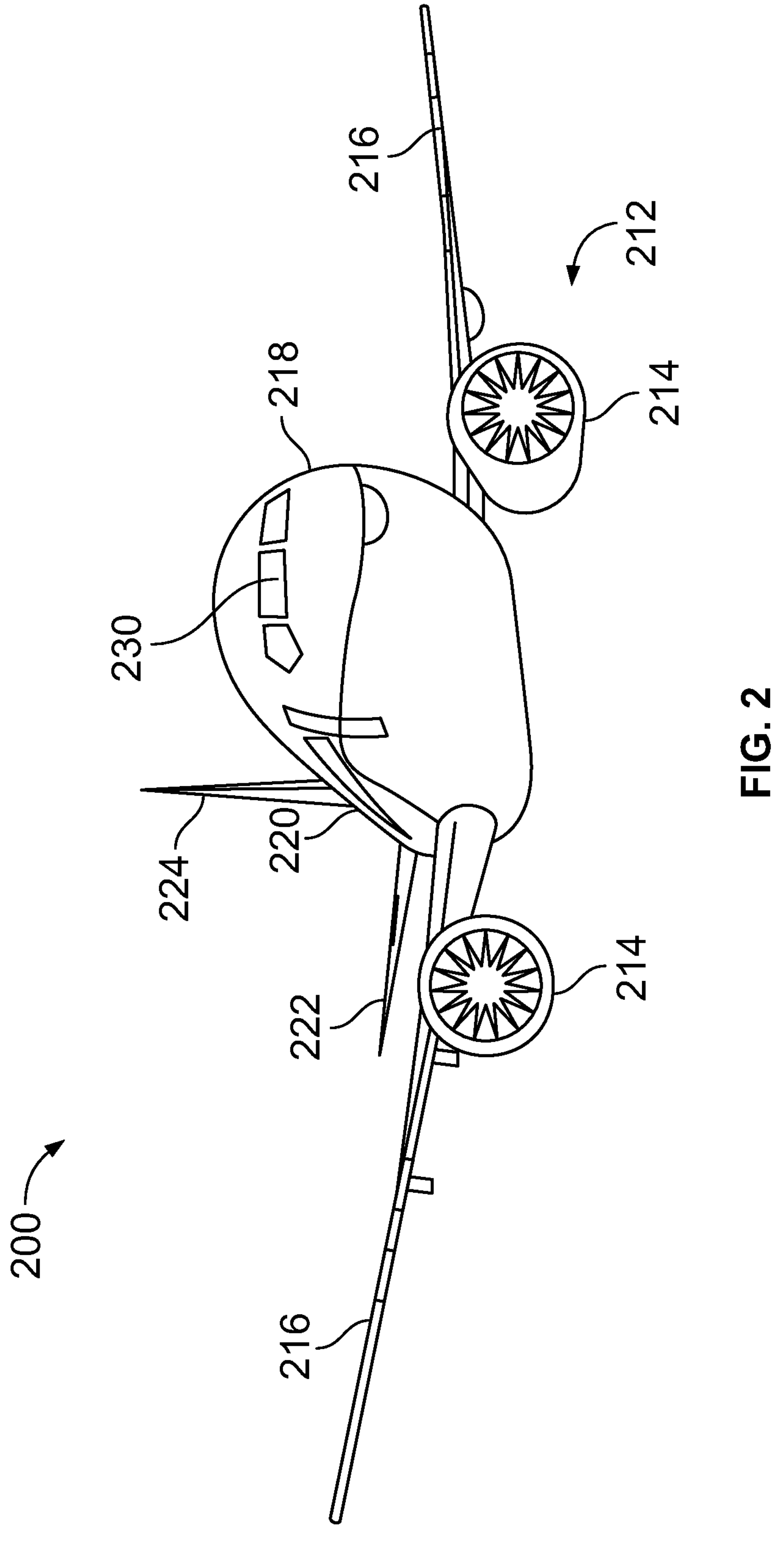
FIG. 2 illustrates a perspective front view of an aircraft, according to an example of the present disclosure.

FIG. 2 illustrates a perspective front view of an aircraft 200, according to an example of the present disclosure. The aircraft 200 is an example of the aircraft 104 shown in FIG. 1. The aircraft 200 includes a propulsion system 212 that includes engines 214, for example. Optionally, the propulsion system 212 may include more engines 214 than shown. The engines 214 are carried by wings 216 of the aircraft 104. In other examples, the engines 214 may be carried by a fuselage 218 and/or an empennage 220. The empennage 220 may also support horizontal stabilizers 222 and a vertical stabilizer 224.

The fuselage 218 of the aircraft 200 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. The internal cabin 230 is an example of the internal cabin 102 shown in FIG. 1.

The aircraft 200 shown in FIG. 2 is merely an example. The aircraft 200 can be sized and shaped differently than shown.

Figure 3:
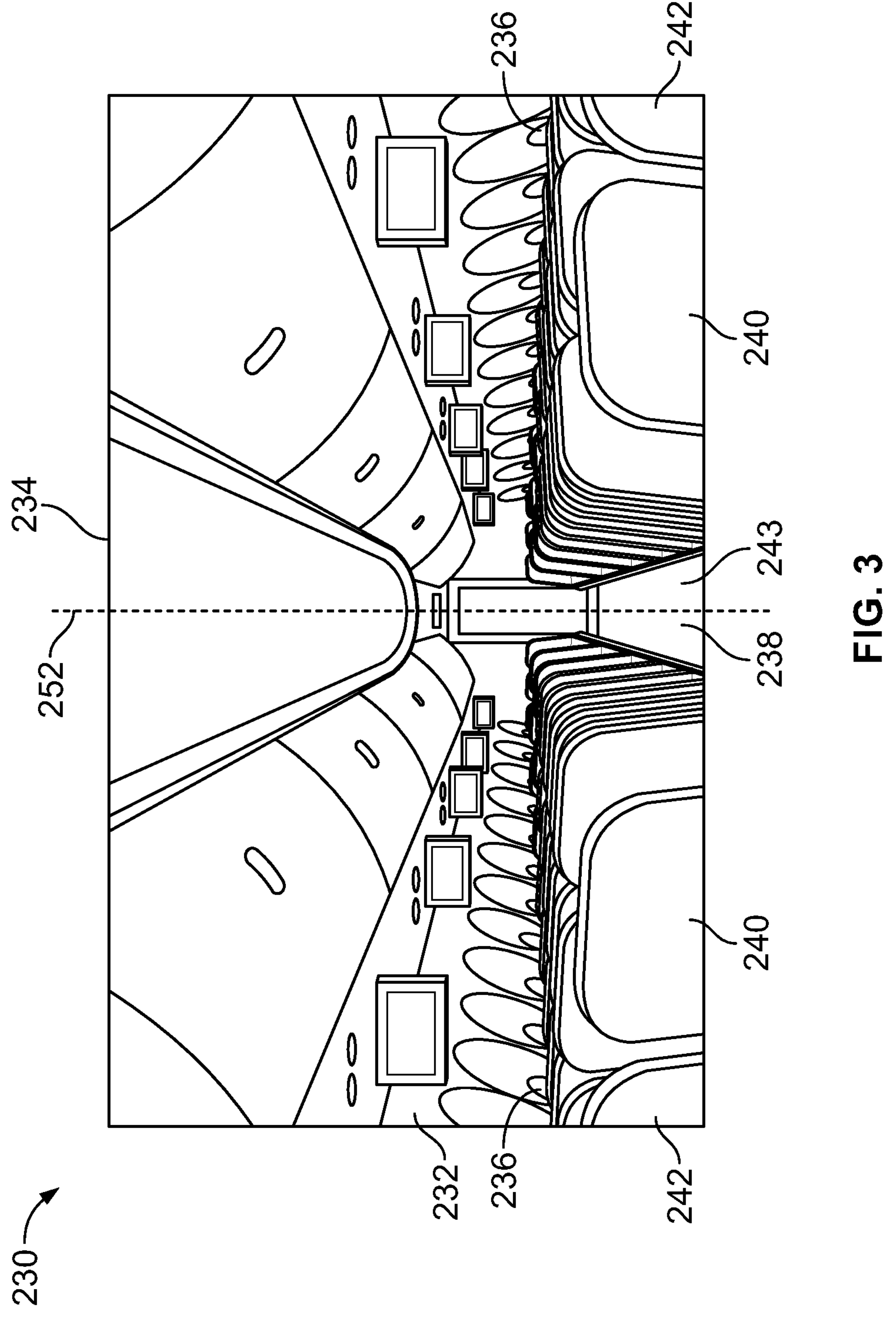
FIG. 3 illustrates a perspective interior view of an internal cabin of an aircraft, according to an example of the present disclosure.

FIG. 3 illustrates a perspective interior view of an internal cabin 230 of an aircraft, according to an example of the present disclosure. The internal cabin 230 includes outboard walls 232 and a ceiling 234. Windows 236 may be formed within the outboard walls 232. A floor 238 supports rows of seats 240. As shown in FIG. 3, a row 242 may include three seats 240 on either side of an aisle 243. However, the row 242 may include more or less seats 240 than shown. Additionally, the internal cabin 230 may include more aisles than shown.

As used herein, the term "outboard" means a position that is further away from a central longitudinal plane 250 of the internal cabin 230 as compared to another component. The term "inboard" means a position that is closer to the central longitudinal plane 250 of the internal cabin 230 as compared to another component.

The internal cabin 230 shown in FIG. 3 is merely an example. The internal cabin 230 can be sized and shaped differently than shown in FIG. 3. Further, the internal cabin 230 can have more or fewer components than shown in FIG. 3. As noted, the internal cabin 230 can have two or more aisles.

Figure 4:
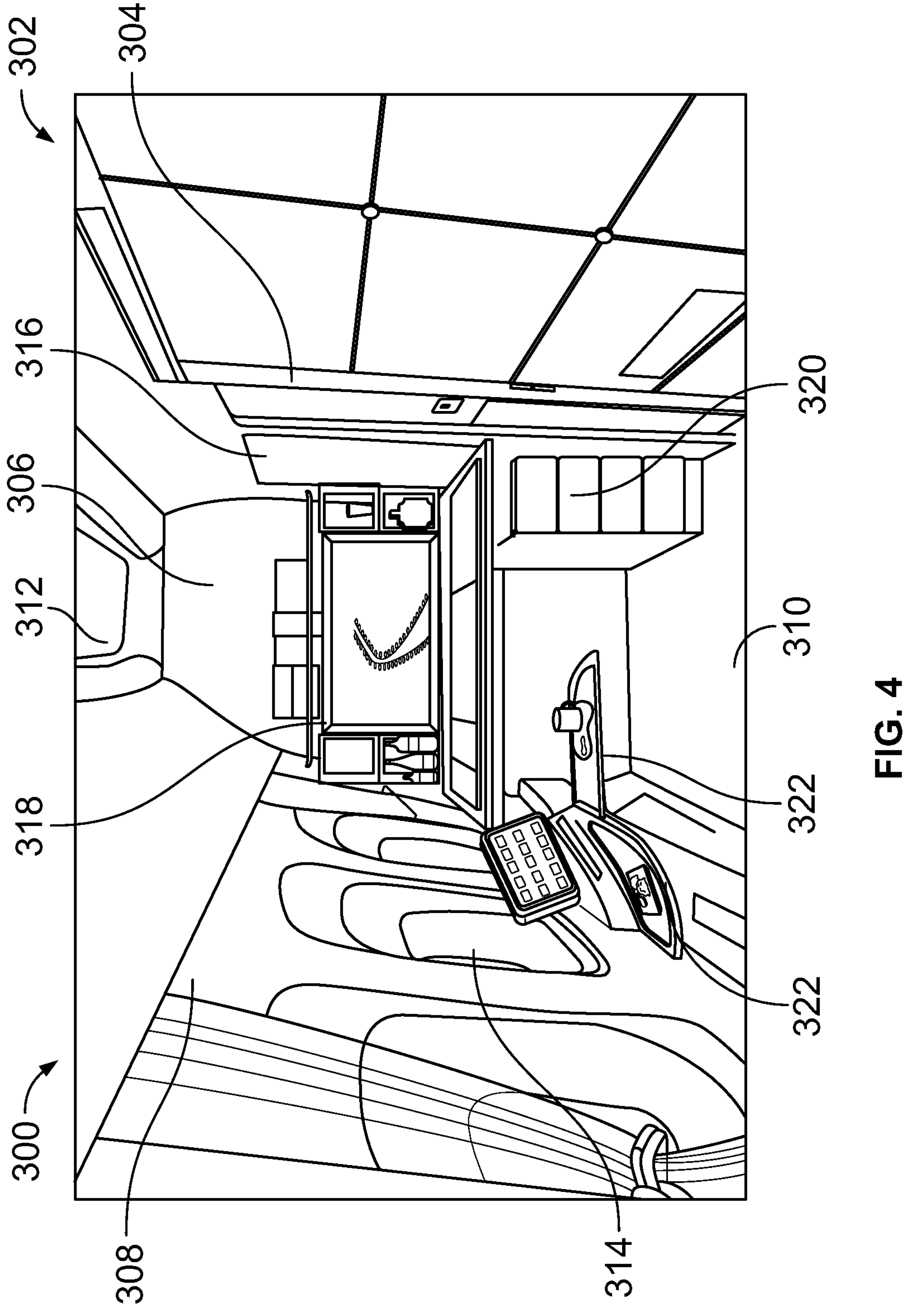
FIG. 4 illustrates a perspective internal view of a suite within an internal cabin of an aircraft, according to an example of the present disclosure.

FIG. 4 illustrates a perspective internal view of a suite 300 within an internal cabin 302 of an aircraft, according to an example of the present disclosure. The suite 300 is an example of the enclosed area 106 shown in FIG. 1. The internal cabin 302 is an example of the internal cabin 102 shown in FIG. 1.

In at least one example, the suite 300, such as a high wall first class suite, is defined between walls 304, 306, and 308 that extend from and between a floor 310 and a ceiling 312. As shown, the wall 304 is an inboard wall, such as proximate to (such as directly next to) an aisle of the internal cabin 302. The wall 306 is an end wall, such as an aft wall or a forward wall. An opposite end wall is not shown in FIG. 4. The wall 308 is an outboard wall, which can include one or more windows 314. The suite 300 can include a service window 316 formed in the wall 304. An electronic monitor 318 can be mounted on the wall 306. A storage compartment 320 can be within the suite 300. One or more trays 322, desks, or tables can be within the suite 300.

Referring to FIGS. 1-4, the venting system 100 can be used with any enclosed area 106 within the internal cabin 102 of the aircraft 104. As an example, the door 108 of the venting system 100 can be provided in one of the walls 304, 306, or 308 of the suite 300. As another example, the door 108 can be provided in the floor 310 or the ceiling 312. As another example, the door 108 can be provided in the ceiling 312.

Figure 5:
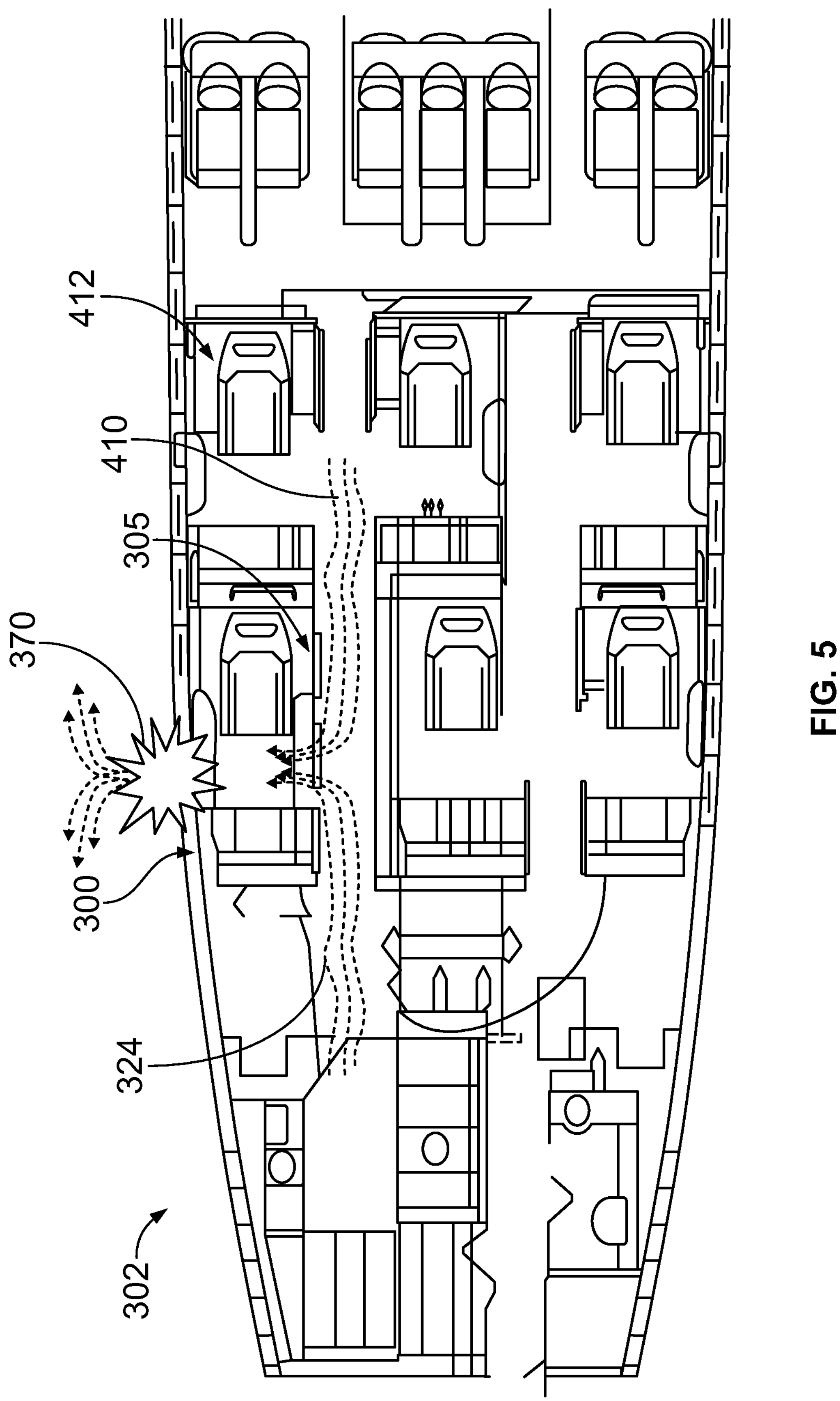
FIG. 5 illustrates a top plan view of a portion of an internal cabin of an aircraft, according to an example of the present disclosure.

FIG. 5 illustrates a top plan view of a portion of the internal cabin 302 of an aircraft, according to an example of the present disclosure. As shown, the suite 300 is disposed within the internal cabin 302, and can be adjacent to an aisle 324.

Figures 6, 7:
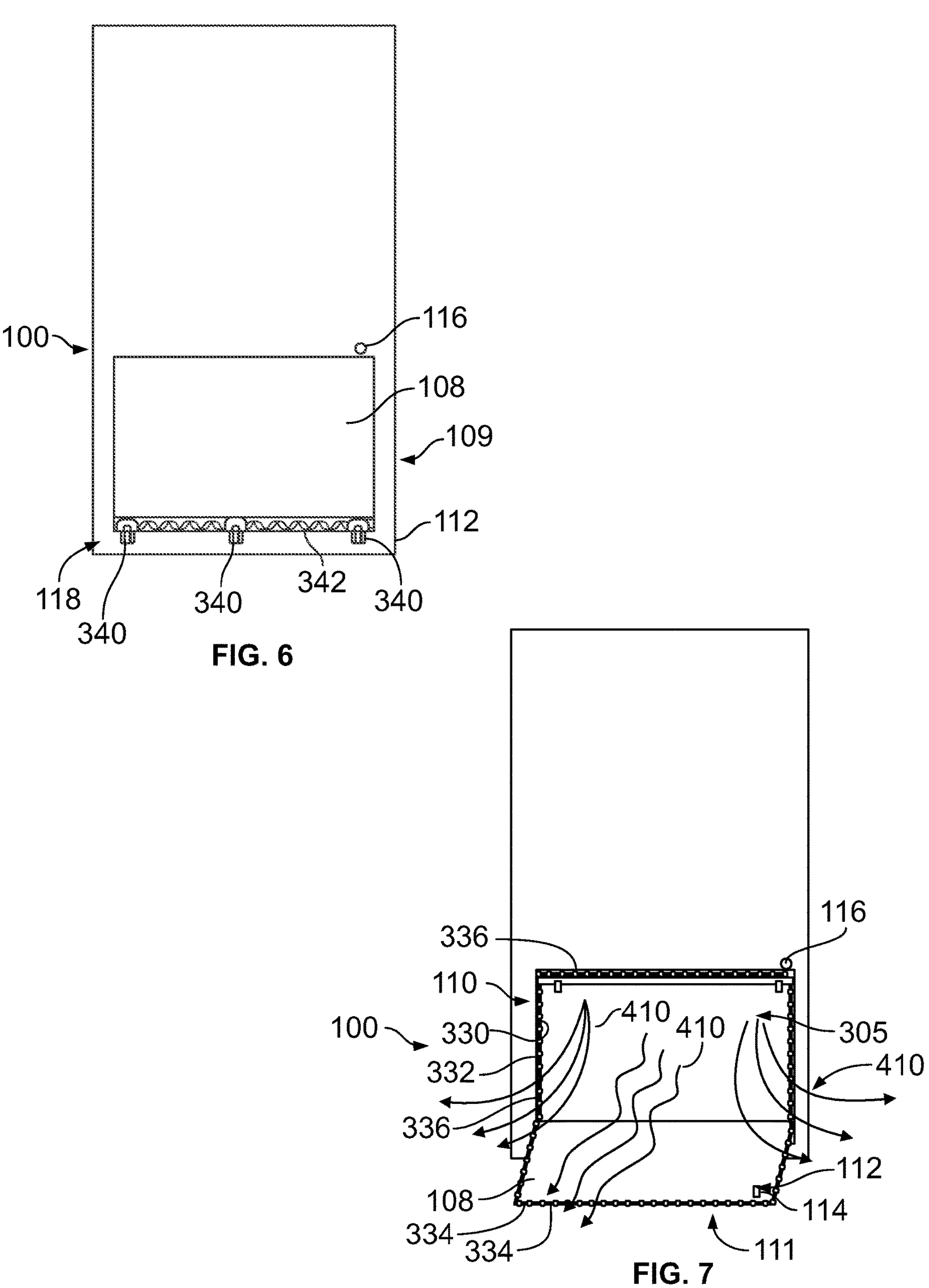
FIG. 6 illustrates a front view of a venting system having a door in a closed position, according to an example of the present disclosure.
FIG. 7 illustrates a front view of the venting system having the door in an open position.

FIG. 6 illustrates a front view of a venting system 100 having a door 108 in a closed position 109, according to an example of the present disclosure. FIG. 7 illustrates a front view of the venting system 100 having the door 108 in an open position 111. In at least one example, the door 108 can detach and move away from a frame.

Referring to FIGS. 1-7, the venting system 100 provides rapid, self-activated venting configured to meet rapid decompression requirements, such as for high wall first class suites with a blowout hole (for example, the suite 300 shown in FIGS. 4 and 5). In the event of rapid decompression inside the enclosed area 106 (such as the suite 300), air 410 from a general cabin area 412 outside of the enclosed area 106 needs to be able to flow into the enclosed area 106 with sufficient speed to neutralize a rapid increase in delta pressure beyond a design threshold between the enclosed area 106 (such as the suite 300) and the general cabin area 412 and the floor 310 to prevent structural anomalies of floor beams within the enclosed area 106 (such as the suite 300). Accordingly, the venting system 100 is configured to provide rapid self-activated venting to quickly neutralize high delta pressure, such as via a delta pressure sensor coupling with a self-activated latch, and a preloaded coiled hinged vent door.

In operation, during a rapid decompression event, the door 108 opens immediately in response to delta pressure reaching a predetermined design threshold. A resulting vent opening 305 (such the opening provided by the door 108 in the open position 111) has sufficient area to ensure rapid air movement into the enclosed area 106 to quickly neutralize a predetermined pressure differential. The frame 110 surrounds the venting opening 305. That is, the vent opening 305 is an open passage within the frame 110. The door 108 in the closed position is disposed within the vent opening 305, thereby closing the vent opening 305. An example of the sufficient area can be 9 square feet. Optionally, the sufficient area can be less than 9 square feet, such as 4 square feet, or greater than 9 square feet, such as 16 square feet.

In at least one example, the frame 110 (for example, a door cutout 330) is reinforced with stiffeners 332, such as ribs, studs, or the like. Optionally, the frame 110 may not be reinforced with stiffeners.

The door 108 can have shear pins 334 spaced to fit into reciprocal slots 336 within the door cutout 330. As shown, the shear pins 334 can be disposed around a periphery of the door 108, and the slots 336 can be spaced around a periphery of the door cutout 330. Optionally, the shear pins 334 can be disposed around less than an entire periphery of the door 108, and the slots 336 can be disposed around less than an entire periphery of the door cutout 330. Optionally, the door 108 can have the slots 336, and the door cutout 330 can include the shear pins 334. Alternatively, the door 108 may not include the shear pins, and the door cutout 330 may not include the slots.

In at least one example, one or more hinges 340 are disposed at the bottom of the door 108 and coupled to a wall 112, for example, The hinges 340 are preloaded in a direction of opening, such as via a preloaded coil 342 (such as a spring coupled to the hinges). The hinge(s) 340 and the coil 342 provide the coil hinges 118. Optionally, the venting system 100 may not include the coil hinges 118.

The latch 114 is configured to provide a lock mechanism to keep the door 108 in the closed position. The latch 114 can be disposed on an interior or exterior surface of the door 108, and configured to couple to a reciprocal structure of the wall 112, for example.

The sensor 116 is disposed proximate to the door 108. For example, as shown in FIGS. 6 and 7, the sensor 116 is mounted on or within the wall 112, such as on the frame 110. The sensor 116 can be above the door 108. Optionally, the sensor 116 can be at various other locations, such as to a side of the door 108, below the door 108, or the like. As another example, the sensors 116 can be disposed on a portion of the door 108. In at least one example, the sensor 116 is a pressure sensor, such as an air pressure sensor. As another example, the sensor 116 can be an electronic sensor that is configured to electrically detect a pressure differential, for example.

In operation, when the door 108 is in the closed position during normal operation, the door 108 carries loads via the interaction of the pins 334 of the door 108, and the slots 336 of the frame 110, such as the door cutout 330, thereby enabling shear-transfer capability. In response to a blowout event 370, when delta pressure increases to a predetermined threshold (as detected by the sensor 116), the sensor 116 triggers the latch 114 to turn and immediately open the door 108, thereby allowing flow of air 410 through the vent opening 305. In at least one example, the opening time is in the range of 10-40 milliseconds. Optionally, the opening time can be less than 10 milliseconds, such as 5 milliseconds, or greater than 40 milliseconds, such as 50 milliseconds. In order to ensure rapid opening of the door 108, the preloaded coil hinge(s) 118 provide additional torque to reliably push the door 108 open faster.

As described herein, examples of the present disclosure provide venting systems and methods including a door, pins, a frame with slots, a preloaded coiled, and a latch, which can be mechanically or electrically activated by the sensor. The systems and methods provide a self-opening, activated panel or door configured to rapidly open in a rapid decompression event.

Further, the disclosure comprises examples according to the following clauses:

Clause 1. A venting system configured to be within an internal cabin of an aircraft, the venting system comprising:

a door configured to be disposed within a frame of a wall of an enclosed area of the internal cabin, wherein the door is configured to move between a closed position and an open position;

a latch configured to retain the door in the closed position; and a sensor operatively coupled to the latch, wherein in response to detecting a predetermined pressure, the sensor is configured to trigger the latch to disengage the door from one or both of the frame or the wall to allow the door to move from the closed position to the open position.

Clause 2. The venting system of Clause 1, further comprising one or more preloaded coil hinges coupled to the door, wherein the preloaded coil hinges are configured to bias the door toward and into the open position.

Clause 3. The venting system of Clauses 1 or 2, wherein the enclosed area is a high wall first class suite.

Clause 4. The venting system of any of Clauses 1-3, wherein the wall is next to an aisle within the internal cabin.

Clause 5. The venting system of any of Clauses 1-4, wherein the door in the open position provides a vent opening in the wall, wherein the frame surrounds the vent opening.

Clause 6. The venting system of Clause 5, wherein the vent opening is configured to allow air from a general cabin area outside of the enclosed area to flow into the enclosed area.

Clause 7. The venting system of any of Clauses 1-6, wherein the frame comprises stiffeners.

Clause 8. The venting system of any of Clauses 1-7, wherein the door comprises pins configured to fit within reciprocal slots of the frame.

Clause 9. The venting system of any of Clauses 1-8, wherein the sensor is configured to be mounted on or within the wall.

Clause 10. An aircraft comprising:

an internal cabin;

an enclosed area within the internal cabin, wherein the enclosed area includes a wall having a frame; and venting system comprising:

a door disposed within the frame of the wall, wherein the door is configured to move between a closed position and an open position;

a latch configured to retain the door in the closed position; and a sensor operatively coupled to the latch, wherein in response to detecting a predetermined pressure, the sensor is configured to trigger the latch to disengage the door from one or both of the frame or the wall to allow the door to move from the closed position to the open position.

Clause 11. The aircraft of Clause 10, wherein the venting system further comprises one or more preloaded coil hinges coupled to the door, wherein the preloaded coil hinges are configured to bias the door toward and into the open position.

Clause 12. The aircraft of any of Clauses 10 or 11, wherein the enclosed area is a high wall first class suite.

Clause 13. The aircraft of any of any of Clauses 10-12, wherein the wall is next to an aisle within the internal cabin.

Clause 14. The aircraft of any of Clauses 10-13, wherein the door in the open position provides a vent opening in the wall, wherein the frame surrounds the vent opening.

Clause 15. The aircraft of Clause 14, wherein the vent opening is configured to allow air from a general cabin area outside of the enclosed area to flow into the enclosed area.

Clause 16. The aircraft of any of Clauses 10-15, wherein the frame comprises stiffeners.

Clause 17. The aircraft of any of Clauses 10-16, wherein the door comprises pins configured to fit within reciprocal slots of the frame.

Clause 18. The aircraft of any of Clauses 10-17, wherein the sensor is mounted on or within the wall.

Clause 19. A method for a venting system within an internal cabin of an aircraft, the venting system comprising:

a door disposed within a frame of a wall of an enclosed area of the internal cabin, wherein the door is configured to move between a closed position and an open position;

a latch configured to retain the door in the closed position; and a sensor operatively coupled to the latch, wherein the method comprises:

detecting, by the sensor, a predetermined pressure;

in response to said detecting, triggering, by the sensor, the latch to disengage the door from one or both of the frame or the wall to allow the door to move from the closed position to the open position, wherein the door in the open position provides a vent opening in the wall, wherein the frame surrounds the vent opening; and allowing air from a general cabin area outside of the enclosed area to flow into the enclosed area through the vent opening.

Clause 20. The method of Clause 19, further comprising biasing, by one or more preloaded coil hinges coupled to the door, the door toward and into the open position.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A venting system configured to be within an internal cabin of an aircraft, the venting system comprising:

a door configured to be disposed within a frame of a wall of an enclosed area of the internal cabin, wherein the door is configured to move between a closed position and an open position, wherein the door comprises pins configured to fit within reciprocal slots of the frame;

a latch configured to retain the door in the closed position; and a sensor operatively coupled to the latch, wherein in response to detecting a predetermined pressure, the sensor is configured to trigger the latch to disengage the door from one or both of the frame or the wall to allow the door to move from the closed position to the open position.

2. The venting system of claim 1, further comprising one or more preloaded coil hinges coupled to the door, wherein the preloaded coil hinges are configured to bias the door toward and into the open position.

3. The venting system of claim 1, wherein the enclosed area is a high wall first class suite.

4. The venting system of claim 1, wherein the wall is next to an aisle within the internal cabin.

5. The venting system of claim 1, wherein the door in the open position provides a vent opening in the wall, wherein the frame surrounds the vent opening.

6. The venting system of claim 5, wherein the vent opening is configured to allow air from a general cabin area outside of the enclosed area to flow into the enclosed area.

7. The venting system of claim 1, wherein the frame comprises stiffeners.

8. The venting system of claim 1, wherein the sensor is configured to be mounted on or within the wall.

9. An aircraft comprising:

an internal cabin;

an enclosed area within the internal cabin, wherein the enclosed area includes a wall having a frame; and a venting system comprising:

a door disposed within the frame of the wall, wherein the door is configured to move between a closed position and an open position, wherein the door comprises pins configured to fit within reciprocal slots of the frame;

a latch configured to retain the door in the closed position; and a sensor operatively coupled to the latch, wherein in response to detecting a predetermined pressure, the sensor is configured to trigger the latch to disengage the door from one or both of the frame or the wall to allow the door to move from the closed position to the open position.

10. The aircraft of claim 9, wherein the venting system further comprises one or more preloaded coil hinges coupled to the door, wherein the preloaded coil hinges are configured to bias the door toward and into the open position.

11. The aircraft of claim 9, wherein the enclosed area is a high wall first class suite.

12. The aircraft of claim 9, wherein the wall is next to an aisle within the internal cabin.

13. The aircraft of claim 9, wherein the door in the open position provides a vent opening in the wall, wherein the frame surrounds the vent opening.

14. The aircraft of claim 13, wherein the vent opening is configured to allow air from a general cabin area outside of the enclosed area to flow into the enclosed area.

15. The aircraft of claim 9, wherein the frame comprises stiffeners.

16. The aircraft of claim 9, wherein the sensor is mounted on or within the wall.

17. A method for a venting system within an internal cabin of an aircraft, the venting system comprising:

a door disposed within a frame of a wall of an enclosed area of the internal cabin, wherein the door is configured to move between a closed position and an open position, wherein the door comprises pins configured to fit within reciprocal slots of the frame;

a latch configured to retain the door in the closed position; and a sensor operatively coupled to the latch, wherein the method comprises:

detecting, by the sensor, a predetermined pressure;

in response to said detecting, triggering, by the sensor, the latch to disengage the door from one or both of the frame or the wall to allow the door to move from the closed position to the open position, wherein the door in the open position provides a vent opening in the wall, wherein the frame surrounds the vent opening; and allowing air from a general cabin area outside of the enclosed area to flow into the enclosed area through the vent opening.

18. The method of claim 17, further comprising biasing, by one or more preloaded coil hinges coupled to the door, the door toward and into the open position.

19. The venting system of claim 1, wherein the pins comprises shear pins spaced to fit into the reciprocal slots of the frame, wherein the shear pins are disposed around a periphery of the door, and wherein the slots are spaced around a periphery of a door cutout of the frame.

20. The venting system of claim 19, wherein the shear pins are disposed around an entirety of the periphery of the door, and wherein the slots are spaced around an entirety of the periphery of the door cutout.

* * * * *